(12) United States Patent
Mentink

(10) Patent No.: US 7,194,947 B2
(45) Date of Patent: Mar. 27, 2007

(54) HYDRAULIC ACTUATING DEVICE

(75) Inventor: Laurentius Andreas Gerardus Mentink, Haaksbergen (NL)

(73) Assignee: Actuant Corporation, Glendale, WI (US)

( * ) Notice: Subject to any disclaimer, the term of this patent is extended or adjusted under 35 U.S.C. 154(b) by 89 days.

(21) Appl. No.: 10/858,433

(22) Filed: Jun. 1, 2004

(65) Prior Publication Data

US 2004/0237773 A1 Dec. 2, 2004

(30) Foreign Application Priority Data

Jun. 2, 2003 (NL) .................................. 1023583

(51) Int. Cl.
*F15B 13/04* (2006.01)
(52) U.S. Cl. .......................................... 91/420; 91/447
(58) Field of Classification Search ................. 91/420, 91/435, 443, 447, DIG. 2
See application file for complete search history.

(56) References Cited

U.S. PATENT DOCUMENTS

| 4,244,275 A | * | 1/1981 | Smilges ........................ 91/420 |
| 4,364,304 A | * | 12/1982 | Andersen et al. ............. 91/420 |
| 4,531,449 A | * | 7/1985 | Reith ........................... 91/420 |
| 4,597,557 A | * | 7/1986 | Krieger et al. ................ 91/420 |
| 4,727,792 A | * | 3/1988 | Haussler ....................... 91/420 |
| 5,191,826 A | * | 3/1993 | Brunner ....................... 91/420 |
| 6,267,432 B1 | * | 7/2001 | Stolle ............................ 91/1 |

FOREIGN PATENT DOCUMENTS

| DE | 1 217 212 B | 5/1966 |
| EP | 1 298 273 A | 4/2003 |
| WO | WO 94 29137 A | 12/1994 |

* cited by examiner

*Primary Examiner*—Michael Leslie
(74) *Attorney, Agent, or Firm*—Quarles & Brady LLP

(57) ABSTRACT

A hydraulic actuating device for moving a retractable hardtop of a convertible car. The actuating device comprises a double-acting hydraulic actuator, the first connection of the actuator being in communication with an associated throttling assembly which is designed to provide either an optionally controllable throttling or a clear passage opening, which is larger than the throttling opening, as a function of a switching parameter. The throttling assembly has a pressure-detection means for detecting the hydraulic pressure in the second working chamber, which pressure-detection means has associated with it a predetermined switching pressure. The throttling assembly is designed such that—when pressurized hydraulic fluid is supplied to the second working chamber—the clear passage opening is active if the detected pressure in the second working chamber is above the switching pressure and that the throttling is active if the detected second working chamber hydraulic pressure is below the switching pressure.

6 Claims, 4 Drawing Sheets

HYDRAULIC ACTUATING DEVICE

FIELD OF THE INVENTION

The present invention relates to an hydraulic actuating device for moving an object. The present invention also relates to a system including an object which can be displaced with respect to a support by said hydraulic actuating device. The present invention in particular envisages a vehicle provided with a covering element for a vehicle opening, for example a convertible roof, door, boot lid, etc., comprising said hydraulic actuating device for moving the covering element.

The hydraulic actuating device comprises a reservoir for hydraulic fluid, a pump having at least one pressure port for delivering pressurized hydraulic fluid, and a double-acting hydraulic actuator for moving an object.

The actuator has an actuator housing with a space inside which a piston can move, which piston, in the said space, delimits a first working chamber and a second working chamber, the actuator furthermore having an object-coupling member, which is connected to the piston and can be coupled to the object, and an associated first and second connection for supplying and discharging hydraulic fluid being provided at each of the chambers.

The first connection of the actuator is in communication with an associated throttling assembly which is designed to provide, for hydraulic fluid passing through the first connection, either an optionally controllable throttling opening or a clear passage opening which is larger than the throttling opening, as a function of a switching parameter.

BACKGROUND OF THE INVENTION

EP 1 031 697, in the name of the present Applicant, in particular FIG. 7 of that document, has disclosed a hydraulic actuating device having a throttling assembly which is in communication with the working chamber on the piston rod side.

The throttling assembly is such that when the piston rod is being extended, during the majority of the stroke the fluid can flow out of the working chamber on the piston rod side virtually without being impeded, via a bypass passage. As soon as the piston closes off the opening of the said bypass passage, the fluid can only flow out via a throttling passage, so that the movement of the piston rod is decelerated.

It is explained in EP 1 031 697 that this hydraulic actuating device is advantageous for example in use for driving the roof of a convertible car. In cars of this type, there is generally a windscreen header, against which the front edge of the roof bears in the closed position of the roof, above the windscreen. The design of many roofs is such that in the final section of the closing movement of the roof, the roof as it were drops forwards onto the windscreen header. Without additional measures therefore, the roof would hit the windscreen header with an undesirably hard impact. The known throttling assembly solves this problem by decelerating the final part of the piston rod movement. The switching parameter is in this case the location of the opening of the bypass passage.

One drawback of the abovementioned known actuating device is that an unusual actuator is required, namely an actuator having a bypass passage and associated additional opening which is connected to the cylinder space. As is known, standard double-acting actuators have two connections, each for an associated working chamber.

OBJECT OF THE INVENTION

It is an object of the present invention to provide a hydraulic actuating device with an improved throttling assembly which can be used in combination with a standard double-acting actuator.

SUMMARY OF THE INVENTION

The invention achieves the abovementioned object by providing a hydraulic actuating device, wherein the throttling assembly comprises a pressure-detection means for detecting a second working chamber hydraulic pressure in the second working chamber, and wherein a predetermined switching pressure is associated with said throttling assembly, and wherein the throttling assembly is designed such that—when pressurized hydraulic fluid is being supplied to the said second working chamber—the throttling assembly provides for hydraulic fluid passing through the first connection the clear passage opening if the detected second working chamber hydraulic pressure is above the predetermined switching pressure and provides the throttling opening if the detected second working chamber hydraulic pressure is below the predetermined switching pressure.

The invention is based on the insight that in many applications, in particular the abovementioned application in a convertible car, it is desirable to throttle the fluid stream flowing out if the object seeks to move more quickly than the rate applied by the supply of hydraulic fluid to the second working chamber. This will clearly be the case for some roofs of convertible cars, in particular for roofs of the retractable hard-top type during the final phase of the closing movement. The weight of the roof then pulls on the extending piston rod as soon as the centre of gravity of the roof has passed a certain point. The "pulling" on the piston rod leads to a pressure drop in the base-side working chamber of the actuator, and this pressure drop is detected by the pressure-detection means. On the basis of this detection, the throttling then becomes active and the intended deceleration takes place. Obviously, it would also be possible to employ an arrangement in which the roof or other object starts to press the piston rod inwards during the retracting movement of the piston rod under the influence of the force of gravity.

One significant advantage of the solution according to the invention is that in this way, by way of example, the position of the convertible car is automatically also taken into account when the throttling is activated. It is possible that cars of this type may be on a considerable slope when the roof is being closed. With the known solution referred to in the introduction, it may be the case that the roof was already in its "dropping section" before the throttling became active.

Other reasons why the piston movement may be carried out faster than intended are also compensated for in the invention, for example because someone is pulling the roof in the closing direction or because additional force is acting on the roof, for example a gust of wind.

It will be clear that the invention can also be used for other situations in which an object is driven hydraulically, for example other hydraulically movable vehicle parts, such as doors, boot lids, etc.

Furthermore, the invention relates to a throttling assembly which can be incorporated in a hydraulic actuating device.

Furthermore, the invention relates to a system having a displaceable object and the associated hydraulic actuating device for displacing the object.

In particular, the invention also relates to a vehicle, in particular a convertible car, provided with a hydraulically displaceable vehicle component, in particular the roof of the convertible car.

The present invention also relates to a method for moving an object by said hydraulic actuating device.

The invention will be explained below with reference to the drawing.

DETAILED DESCRIPTION OF PREFERRED EMBODIMENTS

Figure 1:
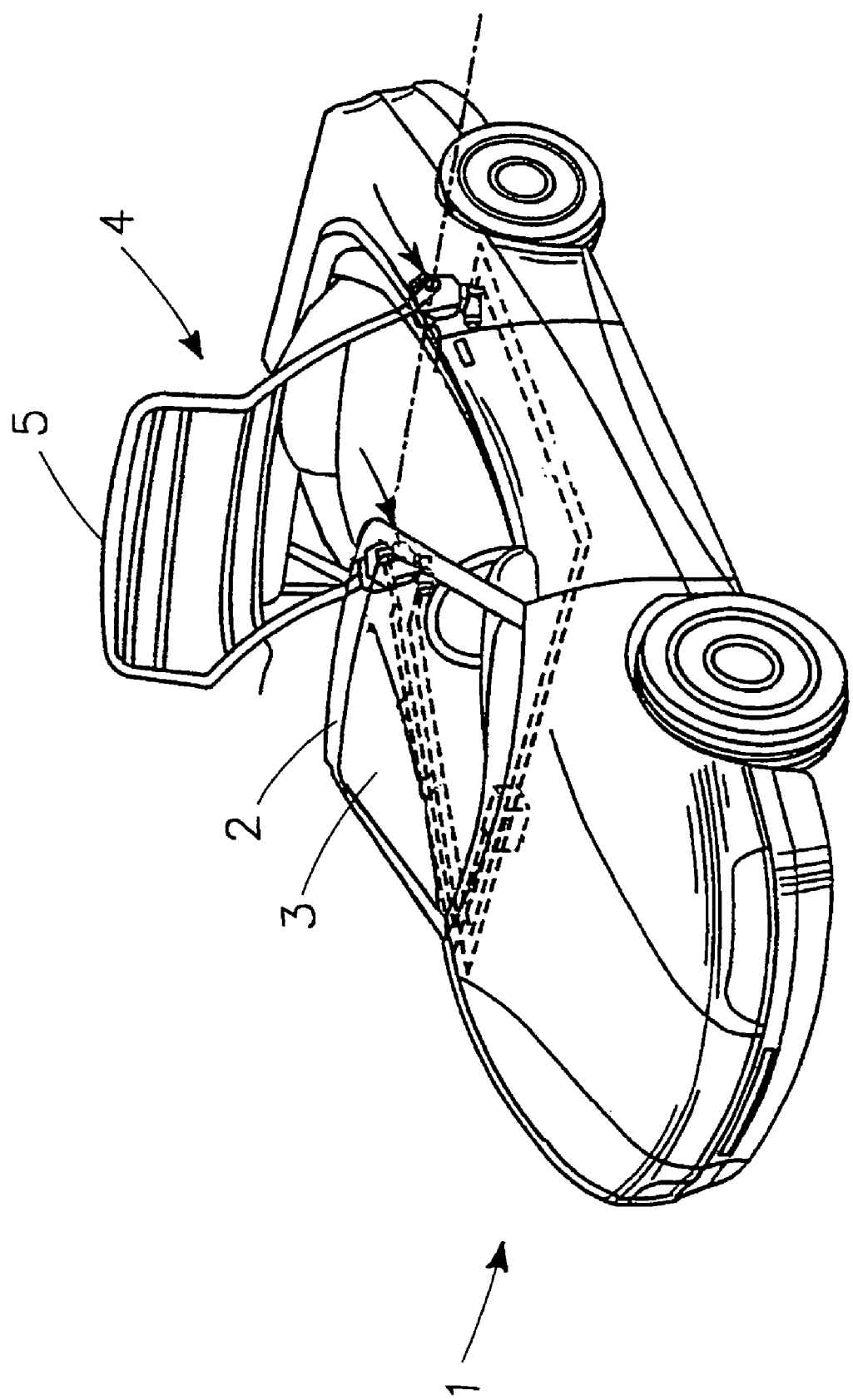
FIG. 1 shows a perspective view of part of a convertible car provided with a hydraulically actuated roof in accordance with the invention.
Figure 4:
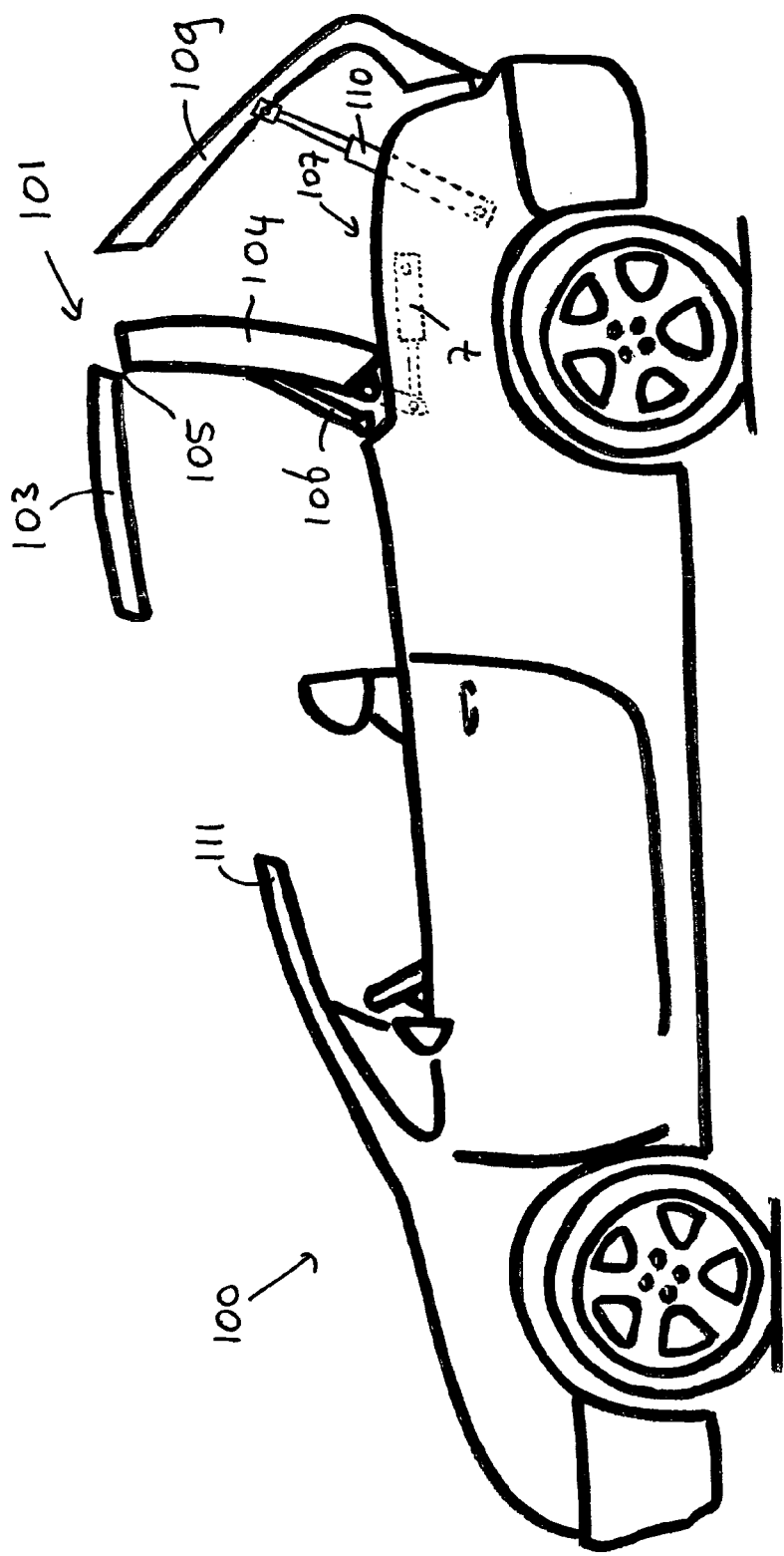
FIG. 4 shows schematically a convertible car having a roof of the retractable hard-top type.

FIG. 1 shows a vehicle 1 of the convertible type having a body provided with a windscreen header 2 along the top of the windscreen 3. There is a movable roof 4 for covering the passenger compartment of the vehicle. In this example, the roof 4 has a frame with a covering of a suitable fabric—what is known as a soft-top—but other embodiments, in particular a roof with rigid panels—known as a retractable hard-top—are of course also possible (as is shown in FIG. 4).

The movable roof 4 has a front edge 5 which, in the closed position of the roof 4, bears against the windscreen header 2, to which it is generally fixed by one or more suitable catches.

To open and close the roof 4, there is a hydraulic actuating device (not shown in FIG. 1) having a hydraulic actuator 7, which acts on the roof 4, on each side of the vehicle 1.

One possible, simple embodiment of a hydraulic actuating device of this type will now be explained in more detail with reference to FIG. 2.

The hydraulic actuating device comprises:
a reservoir 8 for hydraulic fluid,
an electrically driven pump 9 with a pressure port 10 for delivering pressurized hydraulic fluid,
the double-acting hydraulic actuator 7 for moving the roof 4, which actuator 7 has an actuator housing 11 with a space inside which a piston 12 can move.

In this space, the piston 12 delimits a first working chamber 13 and a second working chamber 14. Furthermore, the actuator 7 has an object-coupling member connected to the piston 12, in this example a piston rod 15 which can be coupled to the roof 4.

At each of the chambers 13, 14 there is provided, respectively, an associated first and second connection 16, 17 for supplying and discharging hydraulic fluid.

Figure 2:
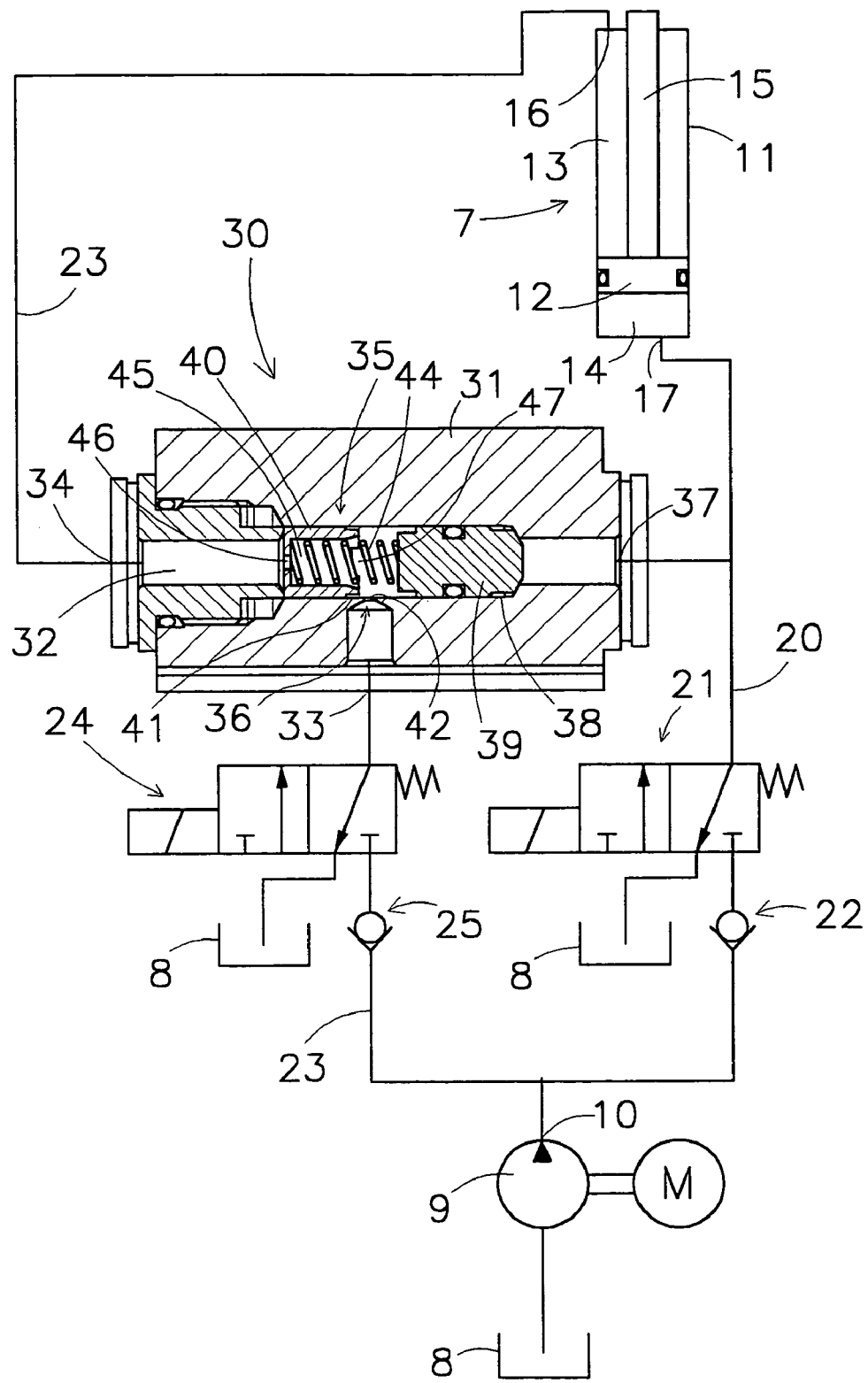
FIG. 2 shows a hydraulic actuating device according to the invention, partially in cross section and partially in circuit diagram form.

FIG. 2 shows just one hydraulic actuator 7; the other is arranged in parallel.

The pressure port 10 is in communication, via a line 20, with the second connection 17. An electrically actuable two-position valve 21 is accommodated in the line 20, so that the connection 17 can be connected to the pressure port 10 or the reservoir 8 as desired. A nonreturn valve 22 is also incorporated in the line, between the valve 21 and the pressure port 10, which valve 22 closes in the direction of the pump 9.

Furthermore, the pressure port 10 is in communication, via a line 23, with first connection 16. An electrically actuable two-position valve 24 is accommodated in the line 23, so that the connection 16 can be connected to the pressure port 10 or the reservoir 8 as desired. A nonreturn valve 25 is also incorporated in the line 23, between the valve 24 and the pressure port 10, which valve 25 closes in the direction of the pump 9.

A throttling assembly 30, which will be explained in detail below, is also incorporated in the line 23.

The throttling assembly 30 is designed to create, for hydraulic fluid passing through the first connection 16, either a controllable throttling or a clear passage opening, which is larger than the throttling opening, as a function of a switching parameter. In particular, the throttling assembly 30 provides a clear passage opening while the piston rod 15 is being retracted, i.e. while hydraulic fluid is being supplied to the chamber 13, so that the flow of liquid is not impeded unnecessarily. While the piston rod 15 is being extended as a result of fluid being supplied to the chamber 14, the throttling assembly 30 initially does not provide any throttling, and operative throttling is only created once the roof 4 seeks to drop forwards onto the windscreen header under the force of gravity.

It should be noted that the two actuators 7 are connected in parallel to the throttling assembly 30.

The throttling assembly 30 has a housing 31 with a first passage 32 which extends between a first working port 33 and a second working port 34. The first working port 33 is connected to the valve 24 and, via the said valve 24, to the pump 9 or the reservoir 8. The second working port 34 is in direct communication with the connection 16 of the actuator 7.

At the first passage 32 there is provided an associated throttling member 35 which provides a controllable throttling opening 36.

Furthermore, the housing 31 is provided with a control port 37 which is in communication with the line 20 and, via this line 20 with the working chamber 14.

In the housing 31 there is a bore 38 which is connected to the control port 37 and has a control piston 39 which can move inside it, so that the control piston 39 on one side is subject to the load from the hydraulic pressure in this control port 37. Referring still to FIG. 2, the control piston 39 is moveable through the bore 38 between a stop provided by a throttling piston 40 on one side and a stop provided by the housing 31 on the opposing side.

The controllable throttling member 35 is in this case formed by a throttling piston 40 which fits in a sliding fashion inside a main bore 41 in the housing 31. This main bore 41 is in line with the bore 38 for the control piston 39.

On one side of the throttling piston 40, the main bore 41 is connected to the first working chamber 13. On the other side of the throttling piston 40, there is a side port 42, which is connected to the main bore 40. This side port 42 is in communication with working port 33 and therefore with the valve 24.

The throttling piston 40 can move to and fro in the main bore 41, so that the throttling piston 40 opens up or partially or completely covers the side port 42, depending on its position. In the said covering state, the throttling piston and the side port together delimit a throttling opening of controllable size. In the position in which the side port 42 is opened up by the throttling piston 40, the throttling assembly provides a clear passage opening for the flow of fluid, the effective opening of this clear passage opening being larger than that of the throttling opening.

There is a spring 44 between the throttling piston 40 and control piston 39, which lie in line with one another. This spring 44 in this example fits into a cavity 45, which is open on the side of the control piston 39, in the throttling piston 40.

Furthermore, in the throttling piston 40 there is a through-passage 46, so that the fluid can flow through the throttling piston 40 between the two working ports 33, 34 of the throttling assembly 30. Consequently, the said through-passage 46 forms part of the line 23.

The throttling piston 40 can be displaced under the influence of the flow of fluid through the through-passage 46 in the throttling piston 40, as will be explained below.

The hydraulic actuating device shown operates in the following way.

When the piston rod 15 is being extended, i.e. in this example the roof 4 is being closed, pressurized hydraulic fluid is supplied to the second working chamber 14 by the pump 9. At the same time, hydraulic fluid flows out of the first working chamber 13. This fluid as it flows out passes through the throttling assembly 30 and reaches the reservoir 8 via the valve 24.

The pressure which is required to extend the piston rod 15 also prevails at the control port 37. The spring 44 is such that this pressure is sufficient to displace the control piston 39 counter to the force of the spring 44, so that the control piston 39 moves onto the throttling piston 40. This bearing contact does not block the flow of fluid from working port 34 to port 33, since the cavity 45 is always in communication with the main bore 41 and therefore opening 42 via one or more transverse connections 47.

At this stage of the extending movement of the piston rod 15, the control piston 39 prevents the throttling piston 40 from becoming active and the fluid can pass through the throttling assembly 30 virtually without obstacle.

As has been mentioned above, while the roof 4 is closing, at a certain moment, generally near the closed position, the centre of gravity of the roof will move past a certain point, after which the roof 4 will seek to pull on the piston rod 15. The front edge 5 of the roof 4 is, as it were, seeking to drop onto the windscreen header 2.

The pulling action of the roof 4 has the effect of making the piston 12 actually move faster than the rate imposed by the supply of fluid to the chamber 14. The result is a drop in the pressure in the chamber 14.

The control piston 39 detects this pressure drop, since when the pressure drops at the control port 37 the spring force of the spring 44 will at a certain moment be sufficient to force the control piston 39 away from the throttling piston 40 again.

The displacement of the control piston 39 which results from the pressure drop in chamber 14 enables the throttling piston 40 to start to provide its throttling action. This is because the flow of fluid through the through-passage 46 leads to a force on the throttling piston 40 which is directed counter to the force of the spring 44. This play of forces is also a defining factor in the position of the throttling piston with respect to the bore 41, in particular with respect to the side port 42. If the flow is extensive, i.e. if the roof is pulling hard on the piston rod, the throttling piston will cover a larger part of the side port 42 and will therefore form a smaller throttling opening.

All in all, therefore, the effective opening of the passage between the ports 34 and 33 of the throttling assembly 30 corresponds to the clear passage opening if the pressure at the control port 37 is above a predetermined switching pressure. If the pressure at the control port 37 is below this predetermined switching pressure, on account of the roof 4 starting to pull on the piston rod, the effective opening of the said passage corresponds to the throttling opening of controllable size.

If the piston rod is being retracted in order to open the roof, the throttling assembly does not provide any throttling action and the clear passage opening is available to the fluid supplied to the chamber 13.

One interesting advantage of the solution shown is that the throttling action now only occurs if desired, namely if the roof starts to pull on the piston rod 15 during the closure movement. If the vehicle is parked on a slope when the roof is being closed, this slope is also taken directly into account. For example, if the vehicle is parked with the front facing downhill, the throttling action will commence earlier than if the vehicle is a horizontal position. There is no need to detect the angle of inclination in this case.

It will be clear that the actuator may also be of other designs, for example with a vane as piston and a rotatable output shaft in order to drive the roof.

It will also be clear that the cylinders could also be arranged in such a way that the retraction of the piston rod corresponds to the closing of the roof. In that case, the throttling feature would have to be connected to the other working chamber rather than the one explained above. In other use situations, it is conceivable for a throttling feature to be connected to both chambers of a cylinder.

Furthermore, the person skilled in the art will recognize that the pressure-detection means may also be designed differently from what is described above, for example in electrical form.

Figure 3:
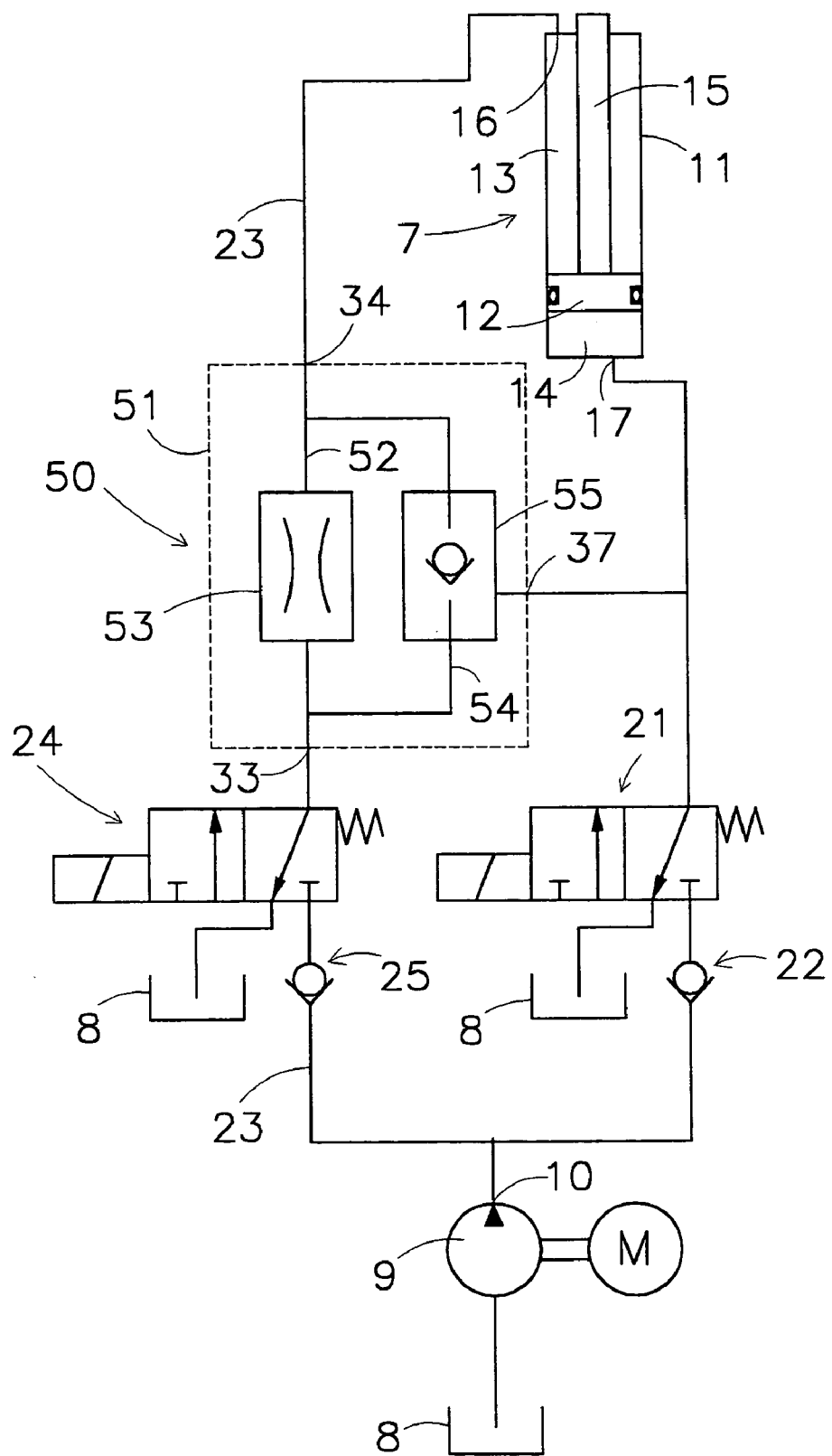
FIG. 3 shows a circuit diagram for an alternative hydraulic actuating device according to the invention.

FIG. 3 diagrammatically depicts an alternative to the actuating device shown in FIG. 2. Corresponding components are denoted by identical reference numerals.

FIG. 3 shows a throttling assembly 50 which serves the same purpose as the throttling assembly 30 shown in FIG. 2.

The throttling assembly 50 has a housing 51 with a first passage 52 which extends between working ports 33 and 34. In the first passage 52 there is a substantially steady-state throttling opening 53. This may be a fixed throttling opening but may also if appropriate be an adjustable throttling opening, for example having an adjustment needle. It is also possible to use a self-adjusting throttling member, for example a pressure-independent flow control valve, which allows a constant volumetric flow irrespective of the pressure.

Furthermore, the throttling assembly 50 has a bypass passage 54 which forms the clear passage opening and forms a bypass round the throttling opening 53.

In the bypass passage 54 there is a valve 55 coupled to the control port 37, in this case a hydraulically actuated nonreturn valve. The valve 55 opens the bypass passage 54 to fluid flowing out of the chamber 13 if the detected second working chamber hydraulic pressure at the control port 37 is above the predermined switching pressure. The valve 55 closes the bypass passage 54 if the detected second working chamber hydraulic pressure is below the predetermined switching pressure.

FIG. 4 shows schematically a convertible car 100 having a roof 101 of the retractable hard-top type for covering a passenger compartment. The roof 101, which is merely an example, has a first and second (semi-)rigid roof panel, 103, 104, connected to each other by a hinge 105. A linkage 106 connects the roof panels 103, 104 to an hydraulic double-acting actuator 7. The roof panels 103, 104 are stored in a compartment 107 in the rear of the car 100. A cover 109, here with associated hydraulic actuator 110, closes said compartment 101.

When closing the roof 101 an undesirable collision between a front edge of panel 103 and a windscreen header 111 is prevented by suitable throttling as explained before.

The invention also provides for an throttling assembly comprising a housing having a first passage which extends between a first and a second working port, an associated throttling member, which provides a controllable throttling opening, being provided at the first passage, which housing is furthermore provided with a control port, a bore connected to the control port being provided in the housing and having a control piston which can move inside it, so that the control piston is subject to load from the hydraulic pressure in the said control port, the controllable throttling member being operatively coupled to the control piston, in such a manner that the effective opening of the first passage corresponds to a clear passage opening if the pressure at the control port is above a switching pressure, and the effective opening of the first passage corresponding to the throttling opening with a controllable dimension if the pressure at the control port is below the said switching pressure.

What is claimed is:

1. A hydraulic actuating device for moving an object comprising:
   a reservoir for hydraulic fluid,
   a pump having at least one pressure port for delivering pressurized hydraulic fluid,
   a double-acting hydraulic actuator for moving the object, which actuator has an actuator housing with a space inside which a piston is moveable, which piston, in the said space, delimits a first working chamber and a second working chamber, the actuator furthermore having an object-coupling member, which is connected to the piston and is adapted to be coupled to the object, and for each of the first and second working chambers an associated first and second connection respectively for supplying and discharging hydraulic fluid,
   an throttling assembly which is in communication with the first connection of the hydraulic actuator, which throttling assembly is adapted to provide, for hydraulic fluid passing through the first connection, either an throttling opening or a clear passage opening which is larger than the throttling opening,
   wherein the throttling assembly comprises a pressure-detection means for detecting a second working chamber hydraulic pressure in the second working chamber, and wherein a predetermined switching pressure is associated with said throttling assembly, and wherein the throttling assembly is designed such that—when pressurized hydraulic fluid is being supplied to the said second working chamber—the throttling assembly provides for hydraulic fluid passing through the clear passage opening if the detected second working chamber hydraulic pressure is above the predetermined switching pressure and provides the throttling opening if the detected second working chamber hydraulic pressure is below the predetermined switching pressure, and wherein the throttling assembly has a housing with a first passage, which is in communication with the first connection, in which a substantially constant throttling opening is provided in the first passage, and in which the throttling assembly furthermore has a bypass passage which forms the clear passage opening and forms a bypass around the throttling opening, a valve coupled to the pressure-detection means being present in the bypass passage for opening the bypass passage if the detected second working chamber hydraulic pressure is above the switching pressure and for closing the bypass if the detected second working chamber hydraulic pressure is below the switching pressure.

2. A hydraulic actuating device for moving an object comprising:
   a reservoir for hydraulic fluid,
   a pump having at least one pressure port for delivering pressurized hydraulic fluid,
   a double-acting hydraulic actuator for moving the object, which actuator has an actuator housing with a space inside which a piston is moveable, which piston, in the said space, delimits a first working chamber and a second working chamber, the actuator furthermore having an object-coupling member, which is connected to the piston and is adapted to be coupled to the object, and for each of the first and second working chambers an associated first and second connection respectively for supplying and discharging hydraulic fluid,
   a throttling assembly which is in communication with the first connection of the hydraulic actuator, which throttling assembly is adapted to provide, for hydraulic fluid passing through the first connection, either a controllable throttling opening or a clear passage opening which is larger than the throttling opening,
   wherein the throttling assembly comprises a pressure-detection means for detecting a second working chamber hydraulic pressure in the second working chamber, and wherein a predetermined switching pressure corresponding to a force on the piston indicating a final part of a movement of the piston is associated with said throttling assembly, and wherein the throttling assembly is designed such that—when pressurized hydraulic fluid is being supplied to the said second working chamber—the throttling assembly provides for hydraulic fluid passing through the clear passage opening if the detected second working chamber hydraulic pressure is above the predetermined switching pressure and provides the throttling opening if the detected second working chamber hydraulic pressure is below the predetermined switching pressure,
   and wherein the throttling assembly has a housing with a first passage, which is in communication with the first connection, in which an associated controllable throttling member is provided at the first passage, and in which the controllable throttling member is operatively coupled to the pressure-detection means, so that the first passage has an effective opening corresponding to the clear passage opening if the detected second working chamber hydraulic pressure is above the predetermined switching pressure, and the first passage has an effective opening corresponding to the throttling opening with a controllable dimension if the detected second working chamber hydraulic pressure is below the switching pressure, and in which the throttling assembly comprises a main bore, in which a throttling piston, which is operatively coupled to the pressure-detection means, is moveable to and fro, which throttling piston, depending on its position, delimits the clear passage opening or the throttling opening, and in which the main bore, on one side of the throttling piston, is connected to the first working chamber, and in which on another side of the throttling piston at least one side port is connected to the main bore, and in which the first passage also extends through the throttling piston, in such a manner that the first passage extends through the side port and the throttling piston and in such a manner that the throttling piston can be displaced under the influence of the flow of fluid through the throttling piston.

3. The hydraulic activating device according to claim 2, wherein said throttling assembly further includes a control piston which is moveable in said main bore and arranged in line with said throttling piston, and wherein a spring is disposed between the throttling piston and the control piston, and wherein said main bore is also in communication with said second working chamber, so that the control piston is subjected to load by the second working chamber hydraulic pressure in the said second working chamber.

4. A hydraulic actuating device for moving an object comprising:
   a reservoir for hydraulic fluid,
   a pump having at least one pressure port for delivering pressurized hydraulic fluid,
   a double-acting hydraulic actuator for moving the object, which actuator has an actuator housing with a space inside which a piston is moveable, which piston, in the said space, delimits a first working chamber and a second working chamber, the actuator furthermore having an object-coupling member, which is connected to the piston and is adapted to be coupled to the object, and for each of the first and second working chambers an associated first and second connection respectively for supplying and discharging hydraulic fluid,
   a throttling assembly which is in communication with the first connection of the hydraulic actuator, which throttling assembly is adapted to provide, for hydraulic fluid passing through the first connection, either a controllable throttling opening or a clear passage opening which is larger than the throttling opening,
   wherein the throttling assembly comprises a pressure-detection means for detecting a second working chamber hydraulic pressure in the second working chamber, and wherein a predetermined switching pressure corresponding to a force on the piston indicating a final part of a movement of the piston is associated with said throttling assembly, and wherein the throttling assembly is designed such that—when pressurized hydraulic fluid is being supplied to the said second working chamber—the throttling assembly provides for hydraulic fluid passing through the clear passage opening if the detected second working chamber hydraulic pressure is above the predetermined switching pressure and provides the throttling opening if the detected second working chamber hydraulic pressure is below the predetermined switching pressure,
   and wherein the pressure-detection means comprises a control piston, which is moveable in an associated bore in a housing of the throttling assembly, which bore is in communication with the second working chamber, so that the control piston is subjected to load by the second working chamber hydraulic pressure in the said second working chamber, in which the throttling assembly has a housing with a first passage, which is in communication with the first connection, in which an associated controllable throttling member is provided at the first passage, and in which the controllable throttling member is operatively coupled to the pressure-detection means, so that the first passage has an effective opening corresponding to the clear passage opening if the detected second working chamber hydraulic pressure is above the predetermined switching pressure, and the first passage has an effective opening corresponding to the throttling opening with a controllable dimension if the detected second working chamber hydraulic pressure is below the switching pressure, and in which the throttling assembly comprises a main bore, in which a throttling piston, which is operatively coupled to the pressure-detection means, is moveable to and fro, which throttling piston, depending on its position, delimits the clear passage opening or the throttling opening, and in which the control piston and the throttling piston are in line with one another, and in which a spring is disposed between the throttling piston and the control piston.

5. A hydraulic actuating device for moving an object comprising:
   a reservoir for hydraulic fluid,
   a pump having at least one pressure port for delivering pressurized hydraulic fluid,
   a double-acting hydraulic actuator for moving the object, which actuator has an actuator housing with a space inside which a piston is moveable, which piston, in the said space, delimits a first working chamber and a second working chamber, the actuator furthermore having an object-coupling member, which is connected to the piston and is adapted to be coupled to the object, and for each of the first and second working chambers an associated first and second connection respectively for supplying and discharging hydraulic fluid,
   a throttling assembly which is in communication with the first connection of the hydraulic actuator, which throttling assembly is adapted to provide, for hydraulic fluid passing through the first connection, either a controllable throttling opening or a clear passage opening which is larger than the throttling opening,
   wherein the throttling assembly comprises a pressure-detection means for detecting a second working chamber hydraulic pressure in the second working chamber, and wherein a predetermined switching pressure corresponding to a force on the piston indicating a final part of a movement of the piston is associated with said throttling assembly, and wherein the throttling assembly is designed such that—when pressurized hydraulic fluid is being supplied to the said second working chamber—the throttling assembly provides for hydraulic fluid passing through the clear passage opening if the detected second working chamber hydraulic pressure is above the predetermined switching pressure and provides the throttling opening if the detected second working chamber hydraulic pressure is below the predetermined switching pressure,
   and wherein the pressure-detection means comprises a control piston, which is moveable in an associated bore in a housing of the throttling assembly, which bore is in communication with the second working chamber, so that the control piston is subjected to load by the second working chamber hydraulic pressure in said second working chamber, in which the throttling assembly has a housing with a first passage, which is in communication with the first connection, in which an associated controllable throttling member is provided at the first passage, and in which the controllable throttling member is operatively coupled to the pressure-detection means, so that the first passage has an effective opening corresponding to the clear passage opening if the detected second working chamber hydraulic pressure is above the predetermined switching pressure, and the first passage has an effective opening corresponding to the throttling opening with a controllable dimension if the detected second working chamber hydraulic pressure is below the switching pressure, and in which the throttling assembly comprises a main bore, in which a throttling piston, which is operatively coupled to the pressure-detection means, is moveable to and fro, which throttling piston, depending on its position, delimits the clear passage opening or the throttling opening, and in which the control piston and the throttling piston are in line with one another, and in which a spring is disposed between the throttling piston and the control piston, and in which the throttling piston has an open cavity, into which the spring fits, on one side of the control piston.

6. A hydraulic actuating device for moving an object comprising:
- a reservoir for hydraulic fluid,
- a pump having at least one pressure port for delivering pressurized hydraulic fluid,
- a double-acting hydraulic actuator for moving the object, which actuator has an actuator housing with a space inside which a piston is moveable, which piston, in the said space, delimits a first working chamber and a second working chamber, the actuator furthermore having an object-coupling member, which is connected to the piston and is adapted to be coupled to the object, and for each of the first and second working chambers an associated first and second connection respectively for supplying and discharging hydraulic fluid,
- a throttling assembly which is in communication with the first connection of the hydraulic actuator, which throttling assembly is adapted to provide, for hydraulic fluid passing through the first connection, either a controllable throttling opening or a clear passage opening which is larger than the throttling opening,
- wherein the throttling assembly comprises a pressure-detection means for detecting a second working chamber hydraulic pressure in the second working chamber, and wherein a predetermined switching pressure corresponding to a force on the piston indicating a final part of a movement of the piston is associated with said throttling assembly, and wherein the throttling assembly is designed such that—when pressurized hydraulic fluid is being supplied to the said second working chamber—the throttling assembly provides for hydraulic fluid passing through the clear passage opening if the detected second working chamber hydraulic pressure is above the predetermined switching pressure and provides the throttling opening if the detected second working chamber hydraulic pressure is below the predetermined switching pressure,
- and wherein the pressure-detection means comprises a control piston, which is moveable in an associated bore in a housing of the throttling assembly, which bore is in communication with the second working chamber, so that the control piston is subjected to load by the second working chamber hydraulic pressure in the said second working chamber, in which the throttling assembly has a housing with a first passage, which is in communication with the first connection, in which an associated controllable throttling member is provided a the first passage, and in which the controllable throttling member is operatively coupled to the pressure-detection means, so that the first passage has an effective opening corresponding to the clear passage opening if the detected second working chamber hydraulic pressure is above the predetermined switching pressure, and the first passage has an effective opening corresponding to the throttling opening with a controllable dimension if the detected second working chamber hydraulic pressure is below the switching pressure, and in which the throttling assembly comprises a main bore, in which a throttling piston, which is operatively coupled to the pressure-detection means, is moveable to and fro, which throttling piston, depending on it s position, delimits the clear passage opening or the throttling opening, and in which the control piston and the throttling piston are in line with one another, and in which a spring is disposed between the throttling piston and the control piston, and in which the throttling piston has an open cavity, into which the spring fits, on one side of the control piston, and in which the throttling piston has a stop for the control piston.

* * * * *